United States Patent

Ultee

[15] 3,706,942
[45] Dec. 19, 1972

[54] PULSED HYDROGEN FLUORIDE LASER

[72] Inventor: Casper J. Ultee, Glastonbury, Conn.

[73] Assignee: United Aircraft Corporation, Hartford, Conn.

[22] Filed: July 17, 1970

[21] Appl. No.: 55,712

[52] U.S. Cl. .................................................331/94.5 G
[51] Int. Cl. ...........................................................H01s 3/00
[58] Field of Search.....................................331/94.5

[56] References Cited

UNITED STATES PATENTS

| | | | |
|---|---|---|---|
| 3,464,028 | 8/1969 | Moeller | 331/94.5 |
| 3,596,202 | 7/1971 | Patel | 331/94.5 |

OTHER PUBLICATIONS

Deutsch: "Molecular Laser Action in Hydrogen and Deuterium Halides," Applied Physics Letters, Vol. 10, pp. 234–236, Apr. 15, 1967.

Rompa et al., "$UF_6$–$H_2$ Hydrogen Fluoride Chemical Laser: Operation and Chemistry," Journal of Chemical Physics, Vol. 49, pp. 4257–4264, Nov. 15, 1968.

Deutsch, Thomas F., "Laser Emission from HF Rotational Transitions." Applied Physics Letters, 7–967 pp 18–20.

Kompa, Karl L. et al., "Hydrofluoric Acid Chemical Laser." Journal Chemical Physics, Vol. 47, 1967. pp. 857–858.

Patel, C. K. N. et al., "Optical Maser Action in C, N, O, S, and Br on Dissociation of Diatomic and Polyatomic Molecules." Physical Review, Vol. 133 No. 5A., 2, March 1964. pp. A1244–1248; p. 1248 relied on.

Primary Examiner—Ronald L. Wibert
Assistant Examiner—Edward S. Bauer
Attorney—Melvin Pearson Williams

[57] ABSTRACT

A hydrogen fluoride gas laser produces output pulses of relatively long duration and high power by the addition of helium to the interacting gases. Various fluorine-containing gas molecules enclosed in an optical cavity are caused to break down by the intermittent discharge of an electric discharge across the gas, providing fluorine atoms which react with hydrogen molecules to form vibrationally excited hydrogen fluoride in the presence of helium atoms; the excited hydrogen fluoride molecules emit laser energy in the 2.7 to 3 micron range.

1 Claim, 1 Drawing Figure

PATENTED DEC 19 1972
3,706,942
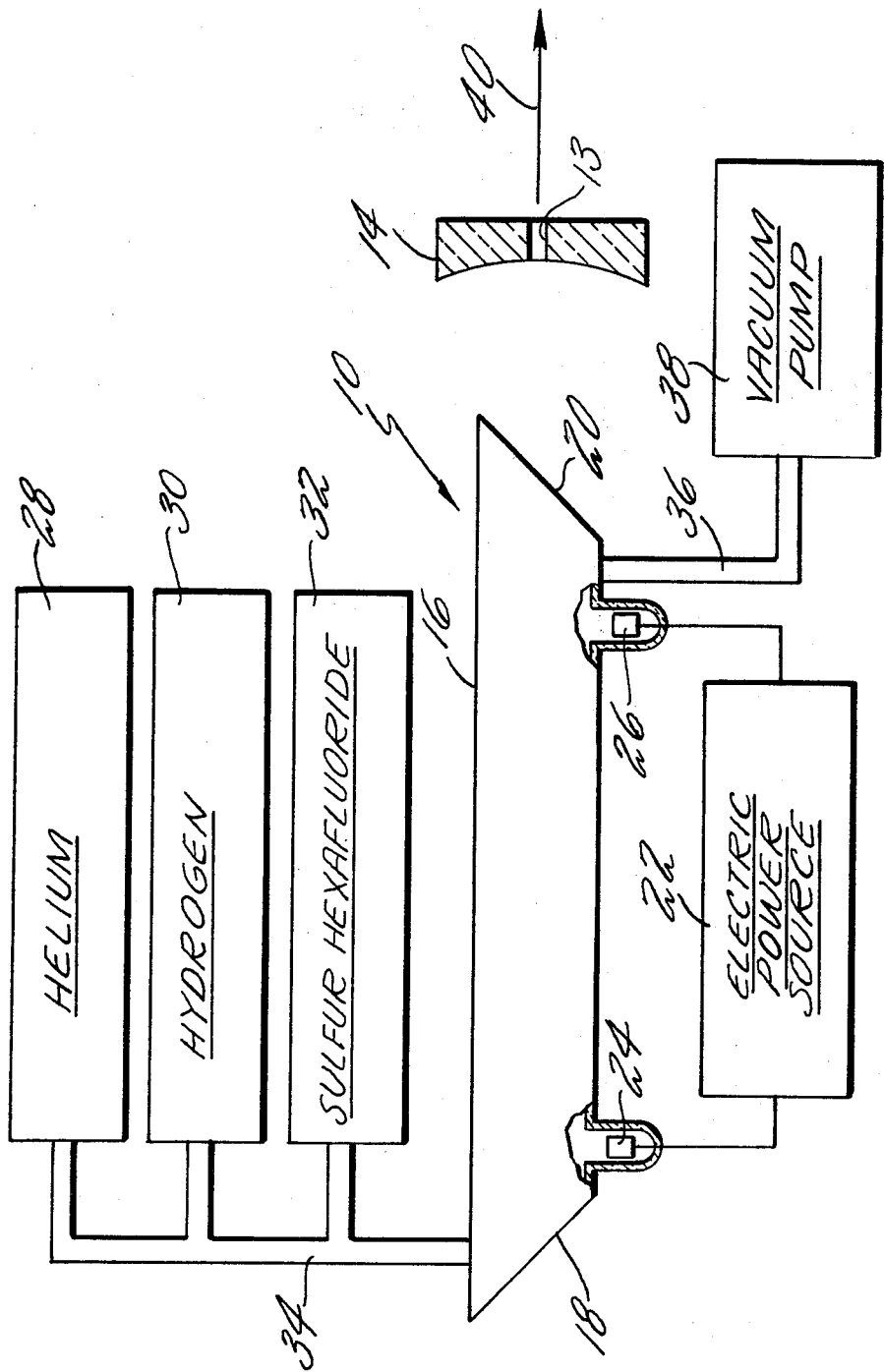
INVENTOR
CASPER J. UTLEE
Melvin Pearson Williams
BY ATTORNEY

PULSED HYDROGEN FLUORIDE LASER

BACKGROUND OF THE INVENTION

1. Field of the Invention

This invention relates to chemical gas lasers and more particularly to a hydrogen fluoride laser which provides output pulses of relatively long duration and high energy.

2. Description of the Prior Art

Much of the effort to date in the development of gas lasers has concentrated around carbon dioxide systems which emit infrared laser radiation at 10.6 micron wavelength. Recently, the hydrogen fluoride laser (as used herein hydrogen includes the isotope deuterium) has been studied and found to be advantageous for several reasons, including efficiency, specific power and the wavelength of the laser energy. The hydrogen fluoride molecule will lase most readily over the range 2.7 to 3.1 microns, although it can be made to lase over the range of 2.6 to 3.5 microns, opening up new applications which the 10.6 micron laser wavelength cannot satisfy as well. For example, at the near visible wavelengths, radiation detectors with relatively good sensitivities are available; gold-doped germanium is about three orders of magnitude more sensitive to three micron radiation than to ten micron radiation when operated at liquid hydrogen temperature; other detectors such as lead sulphide, indium antimide and lead selenide are also sensitive at the shorter wavelengths but do not respond at all to the 10.6 micron wavelength.

Currently, the pulsed hydrogen fluoride laser appears most usable as a laser oscillator for stimulating a laser amplifier or as a probe laser for making gain and relaxation measurements in various gases, or in atmospheric radar application. Since the atmosphere has a characteristic low transmissivity with respect to electromagnetic radiation in the 2.7 to 3.1 micron range, the basic hydrogen fluoride laser energy undergoes severe attenuation during transmission through the atmosphere.

Pulsed laser emission from hydrogen halide and deuterium halide gas was reported by T. F. Deutsch, *Molecular Laser Action in Hydrogen Deuterium Halides*, Applied Physics Letters 10, 234 (1967). The hydrogen halide was formed by the chemical reaction of halide-containing compounds such as $CF_4$ (tetrafluoromethane), $CBrF_3$ (bromotrifluoromethane), $CClF_3$ (chlorotrifluoromethane), and $CCl_2F_2$ (dichlorodifluoromethane) with another reactant such as $H_2$ (hydrogen), $CH_4$ (methane), or $CH_3Cl$ (chloromethane). Similarly, deuterium halides were formed by the reaction of the same halide-containing compounds with deuterium. This article reported hydrogen fluoride pulses typically one microsecond in duration in a relatively long tube of approximately two meters. In a later paper — Kompa, K.C., Pimentel, G.C., *Hydrofluoric Acid Chemical Laser*, J. Chem. Phys. 47, 859 (1967) — the authors described laser emission from hydrogen fluoride and deuterium fluoride produced with photolysis of uranium hexafluoride. The pulses were of relatively short duration (less than 10 microseconds) and required a long time interval between pulses because of the photolysis pumping system. When helium was added to the lasing gases, neither the shape nor duration of the hydrogen fluoride pulses were affected. While these data demonstrate the feasibility of hydrogen fluoride chemical laser, the output pulses are of inadequate power and duration for most applications aforementioned.

SUMMARY OF THE INVENTION

A principal object of the present invention is to increase the duration, repetition frequency and energy of the output laser pulses emitted by a hydrogen fluoride gas laser.

According to the present invention, the pulse duration, pulse repetition frequency, and energy content of pulses of a hydrogen halide laser are all increased many fold by the inclusion of helium in a gaseous mixture including hydrogen and fluorine-containing molecules which is subjected to a high voltage electric discharge within an optical cavity so as to form fluorine atoms; the fluorine atoms then combine chemically with hydrogen to produce excited hydrogen fluoride, as is known, which in turn emits laser pulses of relatively long duration and high energy. Thus although helium has been found in the prior art to not favorably alter the characteristics of a hydrogen fluoride laser, in accordance with the present invention, the characteristics of a hydrogen fluoride laser are significantly increased by the use of helium.

A pulsed hydrogen fluoride laser, according to the present invention, can provide output pulses which can be repeated hundreds of times per second. Because of its improved characteristics, it is also very useful as a practical probe laser in combination with the detector materials which are especially sensitive to the wavelengths normally emitted by the hydrogen fluoride laser. The inherent high efficiency of chemical lasers is achieved in a hydrogen fluoride laser according to the invention due to the increase in width, repetition rate, and energy. With the exception of the actual lasing gas, all of the ingredients necessary in this lasing system are non-toxic and relatively easy to handle; although the hydrogen fluoride is toxic, chemical reactors can be used in the gas exhaust system to provide a simple and effective method of disposing of the hydrogen fluoride gas. The present invention is especially useful to stimulate high power, hydrogen fluoride gas lasers.

Other objects, features and advantages of the present invention will become more apparent in the light of the following description of preferred embodiments thereof, as illustrated in the accompanying drawing.

BRIEF DESCRIPTION OF THE DRAWING

The sole FIGURE herein is a partially broken away schematized elevation view of a laser system used to provide laser pulses in accordance with the present invention.

DESCRIPTION OF THE PREFERRED EMBODIMENT

A hydrogen fluoride laser has been operated in accordance with the present invention using the apparatus shown in the FIGURE. A laser cavity 10 formed by a pair of concave mirrors 12, 14 has the active laser medium contained in a laser discharge tube 16 which is sealed at each of its ends by a transparent Brewster window end closure 18, 20. A source of pulsed direct current electrical power 22 is connected into the discharge tube through a pair of electrodes 24, 26. A helium gas source 28, a hydrogen gas source 30 and a sulfur hexafluoride gas source 32 are connected by an inlet gas manifold 34 to one end of the laser tube 16. The other end of the laser tube 16 is connected through an exhaust pipe 36 to a vacuum pump 38. During operation, the gases are flowed from the sources 28, 30 and 32 through the inlet manifold 34 to the laser tube 16, and the power source 22 causes intermittent electric discharges between the electrodes 24, 26 thereby inducing the sulfur hexafluoride to break down and form fluorine atoms. The reaction is described in standard chemical notation by $$SF_6 \xrightarrow{\text{discharge}} SF_{(6-X)} + XF$$

where
X represents the number of fluorine atoms split off the sulfur hexafluoride atom by the electric discharge. (The number of fluorine atoms yielded by each sulfur hexafluoride molecule cannot be predicted with any certainty.)

The hydrogen and fluorine atoms combine to form excited (*) hydrogen fluoride gas in the reaction $$F + H_2 \longrightarrow HF^* + H.$$

Hydrogen and fluorine can be added as pure molecules but due to the difficulty in handling such toxic and explosive gases, they are preferably added as a component of a compound gas molecule.

The excited hydrogen fluoride molecule lases in the optical cavity 10 and laser energy so produced passes through a hole 13 in the mirror 14 as a beam of useful laser energy 40. The laser mirror 14 is of the hole-coupling type with a single hole 13 in the center of the mirror; however, any energy coupling technique, including a partially transparent mirror, or diffraction coupling techniques can be used. The vacuum pump 38 continuously removes from the laser tube 16 gases comprised essentially of the initial and residual gases created in the tube by the electric discharge across the helium and other source gas mixture. Contemporaneous with the vacuum pump operation, source gases are continuously fed into the tube to provide fresh reactant gas at rates to maintain a proper internal pressure for electric discharge and proper respective partial pressures of the reactants for laser action. The hydrogen fluoride formed in the laser can be trapped by conventional means in sodium hydroxide or similar material if direct exhaust from the vacuum pump is undesired.

The above described system has been operated, in accordance with the present invention, with mixtures of helium and each of the gases $CF_4$ (tetrafluoromethane), $CBrF_3$ (bromotrifluoromethane), $CClF_3$ (chlorotrifluoromethane), $CCl_2F_2$ (dichlorodifluoromethane), $CF_3H$ (trifluoromethane), $CF_2H_2$ (difluoromethane), $CH_3F$ (fluoromethane), $C_2F_6$ (hexafluoroethane) and $SF_6$ (sulfur hexafluoride); the most successful gas has been found to be sulfur hexafluoride.

The effect of the present invention has been shown by operating the system utilizing the fluorine-containing gases without any helium; when optimally adjusted, the system laser output pulses which are necessarily of short duration and of a limited repetition rate, as is true in the case of the prior art. By the addition of helium, a significant increase in the duration of each pulse as well as the achievable pulse rate is noted in each case. For example, it has been found that although a gas system comprised of one torr of sulfur hexafluoride and four-tenths of a torr of hydrogen will lase, when helium is added the pulse length is increased, the greater the partial pressure of helium added the greater the increase in pulse length. The trend of increased pulse length continues until an optimum helium addition of approximately 20 torr is reached; if helium is added beyond that point, the characteristics of the pulse do not change appreciably and the excess helium passing through the laser tube without any detectable affect is apparently surplusage.

The difficulty in establishing an optimum helium addition in a given system should be evident to those familiar with gas electric discharge technology. Part of the problem in predicting the optimum fraction of helium addition is attributed to the fact that the mechanism by which the helium increases the pulse length is not known with certainty. Characteristically, helium is a good coolant gas due to its high thermal conductivity. Also, it is known to be a good relaxant gas which selectively couples with bottleneck levels in some lasing gases to facilitate better lasing. In the present invention, however, the helium apparently affects the electric discharge in some fashion which causes the laser pulse length to be increased. Perhaps helium controls the energy of electrons in the discharge to favor the formation of atomic gas fluorine or excited hydrogen fluoride. This rationale is supportable by the fact that in the flash photolysis work of Pimentel and Kompa, the addition of helium to the lasing gas mixture had no effect on the output laser pulse.

The hydrogen fluoride laser can be pulsed over a wide range of gas composition, input power, and optical path length. The tabulation below describes the practical limits which are associated with this system. Successful experiments have been conducted with the laser tube length varying between 1 centimeter and 300 centimeters but this range is not exclusive. For example, long duration pulses can be produced with laser tubes as short as a few millimeters provided the lasing gas has sufficiently high gain. Also, there is no theoretical limit to the length of such tubes although at much beyond a few meters in length, the electrical discharge equipment requirements become very demanding. A gas discharge electric field gradient of about 200 volts per centimeter was found most suitable for the systems operated.

A tube inner diameter of 1 centimeter was found practical in all cases. Laser tube diameters considerably less than 1 centimeter can be made to operate, however, the smaller the bore of the laser tube, the more difficult it is to get proper optical alignment of the tube within the optical cavity. Similarly, laser tube diameters considerably greater than 1 centimeter will function but with less efficiency. At the larger diameters, the electric discharge through the tube tends to follow an irregular path between the inner walls of the tube and much of the vibrationally excited lasing gas is outside the active lasing region and not utilized. The systems were operated with a total gas pressure generally less than about 150 torr with a power source capable of providing approximately 0.06 to 3 joules of energy at 20,000 volts. The gas pressure can be allowed to go higher but the electric system becomes more involved.

In the following table, the ranges of partial pressures indicated are (as far as is known) the approximate practical limits for lasing operation, although some lasing may occur even outside of the limits prescribed. Also, it should be noted that for any given working system, the constituent gases are not necessarily all simultaneously present in the proportions indicated at the extreme high ends of the pressure ranges. For example, a lasable composition might consist of a substantial partial pressure of helium and relatively small partial pressures of both sulfur hexafluoride and hydrogen.

Gas Partial Pressures (torr)

|  | 150 cm laser tube | | 1 cm laser tube | |
| --- | --- | --- | --- | --- |
|  | High | Low | High | Low |
| $SF_6$ | 3 | 0.1 | 40 | 0.1 |
| He | 50 | 0 | 100 | 0 |
| $H_2$ | 1 | 0.1 | 25 | 0.1 |

In a typical operational system, the laser tube 16 having end closures 18, 20 of sodium chloride was 8 millimeters in diameter and 129 centimeters in length. The end mirrors 12, 14 being 2 inches in diameter were made of copper and were separated by a distance of 150 centimeters. The mirror 14 was of the hole-coupling type with one hole approximately 1 millimeter in diameter (although holes as large as 5 millimeters have been used in some systems). The electrical energy source 22 provided 0.06 joules of 20 kilovolt power obtained by discharging a capacitor through the primary of a high voltage step-up transformer. The rate at which the electric discharge between the electrodes 24, 26 could be repeated depended upon the input power to the source of the pulse discharge 22, the higher the input power the higher the repetition rate of the discharge through the laser tube. Pulse repetition rates as high as 300 per second were achieved although this was a limitation of only the particular source of electrical power in use and not a reflection of any inherent limitation upon the system.

Using sulfur hexafluoride gas as the fluorine source, the gas pressure in the lasing tube 16 consisted of one torr of sulfur hexafluoride, four tenths of a torr of hydrogen and 20 torr of helium; the hydrogen constituent was the most sensitive additive. With a hydrogen pressure as low as about one tenth of a torr, long output pulses were produced with long delays between the time the electrical pulse was initiated in the laser tube and when the laser pulse was emitted through the output mirror 14. The long delay was due probably to the slow rate of reaction of the hydrogen with the fluoride. Increasing the amount of hydrogen present reduced the time lag between the electrical pulse and the laser pulse due apparently to the increase in the rate of excited hydrogen fluoride formation. If too much hydrogen is present, the gas mixture will not lase. Output pulses of up to eighty microseconds in duration were produced with this apparatus as contrasted to the prior art wherein pulses were typically one to 5 microseconds long and in no case longer than about 9 seconds.

Although lasing activity was observed in the case of $CF_3H$ (trifluoromethane), $CF_2H_2$ (difluoromethane) and $CH_3F$ (fluoromethane) without any other gas mixture present, the addition of even a small amount (i.e., one tenth of a torr) of hydrogen gas improved the laser performance substantially. However, the addition of helium was the main contributor to increased pulse duration. The output power of the laser was improved considerably in all cases when helium was added to the gas mixture flowing through the lasing tube. With the addition of helium, the pulse length would increase typically to about 40 microseconds without any substantial decrease in peak power.

Although the invention has been shown and described with respect to preferred embodiments thereof, it should be understood by those skilled in the art that various other changes and omissions in the form and detail thereof, may be made therein without departing from the spirit and scope of the invention.

Having thus described typical embodiments of my invention, that which I claim as new and desire to secure by Letters Patent of the U.S. is:

1. The method of producing pulses of laser energy having a duration in excess of 10 microseconds with a hydrogen fluoride gas laser which has a laser tube positioned within an optical cavity and which is adapted to receive a flow of gas therethrough, including the steps of:

flowing a gas mixture through the tube, the mixture consisting essentially of hydrogen, helium and sulfur hexafluoride wherein the total gas pressure within the tube is between 10 and 150 torr, the helium to sulfur hexafluoride partial pressure ratio is about 20, and the sulfur hexafluoride to hydrogen partial pressure ratio is about 10; and discharging an electric current periodically across the gas mixture to provide fluorine atoms by dissociation of the sulfur hexafluoride whereby the fluorine chemically reacts with the hydrogen and produces excited hydrogen fluoride gas which yields pulses of laser energy by stimulated emission in the cavity.

* * * * *